United States Patent [19]

Vandichel et al.

[11] Patent Number: 5,124,369

[45] Date of Patent: Jun. 23, 1992

[54] PROCESS FOR PREPARING SOFT FLEXIBLE POLYURETHANE FOAMS AND A POLYOL COMPOSITION USEFUL IN SAID PROCESS

[75] Inventors: Jean-Claude N. E. Vandichel; Rene Aerts; Alan M. Batt, all of Ottignies, Belgium

[73] Assignee: Shell Oil Company, Houston, Tex.

[21] Appl. No.: 586,119

[22] Filed: Sep. 21, 1990

[30] Foreign Application Priority Data

Nov. 8, 1989 [EP] European Pat. Off. ........... 89202849

[51] Int. Cl.$^5$ .................. C08G 18/16; C08J 9/06; C08L 75/04

[52] U.S. Cl. .................. 521/155; 521/125; 521/130; 521/137; 521/170; 521/174

[58] Field of Search ............... 521/125, 131, 137, 174, 521/130, 170, 155

[56] References Cited

U.S. PATENT DOCUMENTS

| | | | |
|---|---|---|---|
| 2,846,408 | 8/1958 | Brochhagen et al. | 260/2.5 |
| 3,215,652 | 11/1965 | Kaplan | 260/2.5 |
| 4,127,515 | 11/1978 | MacRae et al. | 521/112 |
| 4,173,691 | 11/1979 | Treadwell | 521/125 |
| 4,314,034 | 2/1982 | Fulmer et al. | 521/65 |
| 4,490,490 | 12/1984 | Patton, Jr. et al. | 521/174 |
| 4,613,543 | 9/1986 | Dabi | 428/304.4 |
| 4,686,240 | 8/1987 | Bailey, Jr. et al. | 521/125 |
| 4,785,026 | 11/1988 | Yeakey et al. | 521/137 |
| 4,868,043 | 9/1989 | Eling et al. | 521/125 |

FOREIGN PATENT DOCUMENTS

| | | |
|---|---|---|
| 220697 | 5/1987 | European Pat. Off. . |
| 55-151034 | 5/1979 | Japan . |
| 57-061076 | 4/1982 | Japan . |
| 59-004613 | 1/1984 | Japan . |
| 60-048704 | 3/1985 | Japan . |
| 1475539 | 6/1977 | United Kingdom . |
| 1538809 | 1/1979 | United Kingdom . |
| 1550614 | 8/1979 | United Kingdom . |

*Primary Examiner*—John Kight, III
*Assistant Examiner*—John M. Coone

[57] ABSTRACT

A process for preparing a soft flexible polyurethane foam by reacting (a) one or more organic polyisocyanates with (b) one or more polyols having a molecular weight in the range from about 400 to about 12,000, in the presence of (c) a catalyst, (d) a blowing agent, and (e), if desired, auxiliaries and/or additives, wherein the blowing agent (d) comprises water in admixture with about 0.01 to about 1 pbw, per 100 pbw polyol (b), of one or more non-crosslinked organic polyelectrolytes having a molecular weight in the range from about 1000 to about 20,000,000.

11 Claims, No Drawings

PROCESS FOR PREPARING SOFT FLEXIBLE POLYURETHANE FOAMS AND A POLYOL COMPOSITION USEFUL IN SAID PROCESS

FIELD OF THE INVENTION

The invention relates to soft flexible polyurethane foams, a process for preparing the same, and to a starting polyol composition useful in said process.

BACKGROUND OF THE INVENTION

Soft flexible polyurethane foams have traditionally been made by reacting one or more organic polyisocyanates with one or more polyols having a molecular weight in the range of from 400 to 12,000, in the presence of a catalyst, a blowing agent, and if required, auxiliaries and/or additives (foam stabilisers, flame retardants, liquifiers, cell-openers, etc.). A halogenated hydrocarbon, such as a freon, is commonly used as the blowing agent. Soft to very soft foams are prepared in this manner, with a (relatively) high to very high density, depending among other factors on the character of the polyol(s) (particularly the molecular weight thereof) and of the polyisocyanate(s).

Because the use of halogenated hydrocarbons as blowing agents is suspected to cause environmental and health problems (for instance, as a result of their role in promoting the deterioration of the earth's ozone layer), there is a growing need for a blowing agent that may partly or even entirely replace the halogenated hydrocarbon in standard foam formulations. However, the use of substitute blowing agents should not result in a sacrifice in the quality of the product, or demand significant changes in the current processes and facilities for foam preparation.

The present invention relates to the use in such a reaction process of a blowing agent which comprises water in admixture with one or more non-crosslinked, water-soluble, organic polyelectrolytes, e. g., a polyacrylate compound. Water-blown polyurethane foam preparation processes are well known in the art. Water reacts with isocyanate groups to evolve carbon dioxide. However, this prior art fails to disclose processes utilizing non-crosslinked, water-soluble organic polyelectrolytes.

A number of prior art references describe polyurethane foams which incorporate non-water-soluble, crosslinked polyelectrolytes. For instance, Great Britain Patent Specification 1,538,809 describes a process in which a polyurethane prepolymer is reacted with water in a mixture with a salt of a crosslinked carboxylmethyl cellulose. The crosslinked carboxymethyl cellulose salts are described as essentially water-insoluble absorbent fibers which are incorporated into the polyurethane foam to enhance its hydrophilicity. U.S. Patent 4,127,515 similarly describes reacting a prepolymer with water swellable, acidic carboxylic cross-linked polymers ("Carbopols"). Great Britain Specification 1,550,614 discloses composite absorbent materials incorporating cross-linked water-swellable starch particles in flexible polyurethane foams. Japanese Patent Specifications 57061076, 55151034 and 59004613 describe polyurethane foams containing water-absorbing resins such as sodium polyacrylate, carboxymethyl cellulose, polyvinyl alcohol, starch and the like.

In other prior art processes, water-soluble polyectrolytes have been added to aqueous emulsions of polyurethanes. The polyelectrolytes have functioned to modify the physical properties of polyurethane products, rather than as blowing agents in a reaction. Japanese Patent Specification 60048704, for instance, teaches the addition of water-soluble high polymer (e.g., polyacrylic acid or sodium polyacrylate) to a polyurethane in an aqueous surfactant solution, for the preparation of a coating material useful in cosmetics. Great Britain Patent Specification 1,475,539 discloses coating techniques in which polyurethane polymers are dispersed into water together with thickeners such as sodium methyl cellulose, polyacrylates, alginates, and polyvinyl alcohols.

U.S. Pat. No. 4,127,515 also mentions the addition to polyurethane prepolymer/water reactions of small amounts of emulsion stabilizers, thickeners and/or protective colloids such as triethanolamine sulfate, carboxymethylcellulose, polyvinyl pyrrolidone, water insoluble soaps, and polyacrylic acid. U.S. Pat. No. 4,314,034 describes the manufacture of polyurethane foam sponges upon the mixing of a polyurethane prepolymer and water, in which suspending or thickening agents (particularly the Carbopol polyacrylic acid polymers) are used to suspend and lubricate polyester fibers added to give the sponges structural rigidity. European Patent Specification 220697 discloses that various alkali and alkaline earth metal salts of Bronsted acids act as foam modifiers for polyurethanes, enhancing mold release and green strength.

SUMMARY OF THE INVENTION

It is an object of the present invention to provide a process for manufacturing high quality soft flexible foams, which reduces or eliminates the use of halogenated hydrocarbons as blowing agents.

Accordingly, the present invention provides an improvement upon a process for preparing a soft flexible polyurethane foam which comprises a step for reacting (a) one or more organic polyisocyanates with (b) one or more polyols having molecular weights in the range from about 400 to about 12,000, in the presence of (c) a catalyst, and (d) a blowing agent. The improvement specifically relates to the use in this process of a blowing agent which comprises water in admixture with one or more non-crosslinked, water-soluble, organic polyelectrolytes having a molecular weight in the range of 1000 to 20,000, preferably in the range of from 1200 to 5,000,000. The one or more polyelectrolytes are applied in a quantity of from about 0.001 to about 5 parts by weight (pbw), per 100 parts by weight of the one or more polyol reactants (b). Preferably the blowing agent (d) comprises at most a minor proportion of halogenated hydrocarbon. Embodiments eliminating the use of halogenated hydrocarbon blowing agents are particularly preferred.

It is a further object of the invention to provide soft flexible polyurethane foams that have a hardness (measured by DIN 53577) of less than 3.0 kPa, preferably less than 1.5 kPa, most preferably less than 2.25 kPa. It has surprisingly been found that the important properties of the foams prepared according to the improved process of the invention are not materially different from those of foams prepared under the use of halogen containing blowing agents. Most beneficially, the foams prepared according to the invention do not differ in hardness and density from conventionally prepared foams. The presently prepared foams may only be distinguished by chemical analysis (e.g., gas chromatography in combination with mass spectroscopy, IR and NMR techniques) due to the presence of the non-crosslinked polyelectrolyte or its counterions, and/or by optical inspection of the foam's cell dimensions, crystallinity, cell packing arrangements, etc.

DETAILED DESCRIPTION OF THE INVENTION

The organic polyelectrolytes useful in the present invention are organic polymers that ionize to form macro-ions upon dissolution into water or into other strong polar solvents. Preferably, the organic polyelectrolytes are selected from macro-anion forming polyelectrolytes such as polyacrylates, and macro-cation forming electrolytes such as, for instance, poly(vinylbutylpyridinium bromide). More preferably, the polyelectrolyte component is one or more polyacrylate salts.

In contrast to uses made of polyelectrolytes in prior art polyurethane compositions, the present invention employs one or more polyelectrolytes that are soluble in the starting composition, will be uniformly distributed throughout the final foam, and will result in a foam having a hardness comparable to that obtained by use of halogen containing blowing agents.

The amount of polyelectrolyte applied in the process of the invention is generally between about 0.001 and about 5 parts by weight (pbw), per 100 pbw of polyol. When one or more polyacrylate salts are used, the preferred amount will depend on their molecular weights and upon the nature of the foam forming process. Thus, when the polyacrylate molecular weight(s) are in the range from about 100 to about 20,000,000, preferably from about 0.001 to about 5 pbw per 100 pbw polyol is used when processing in a mould, and from about 0.005 to about 5 pbw per 100 pbw polyol is used when processing in a slabstock process. It has been found that if lesser amounts are used in either case, the benefits of the invention will not be noticeable, and if more than 5 pbw (per 100 pbw of polyol) is used, the foam will normally be unstable during the polymerization, i.e., it is subject to collapse unless excessive use is made of auxiliaries.

More preferably, the polyacrylate salt has a molecular weight in the range from about 1000 to about 100,000, and is employed in an amount in the range from about 0.01 to about 0.8 pbw per 100 pbw of polyol. Most preferably, the polyacrylate salt has a molecular weight in the range from about 1500 to about 10,000, and is employed in an amount in the range from about 0.01 to about 0.5 pbw per 100 pbw of polyol, depending on the degree of hardness desired for a given foam formulation.

The counterion for the polyelectrolyte is selected from (a) tetra-substituted and/or non-protonic onium ions such as tetrabutylammonium or tetraethylphosphonium, and (b) alkali metal (preferably sodium or potassium) ions. No advantage is observed for the practice of the invention if the counterion is ammonium, calcium or magnesium.

The polyacrylic residue may be the residue of a homopolymer of an optionally substituted acrylic acid, or the residue of a copolymer of two or more optionally substituted acrylic acids. Substituted acrylic acids in that respect comprise not only $C_1$ to $C_4$ - alpha, or beta-vinyl substituted acrylic acids, but also acrylic acids which may contain an alkyl group and/or a halogen group. The preferred substituted acrylic acid is methacrylic acid. Accordingly, the preferred polyacrylic residue may be the residue of the homopolymer of either acrylic or methacrylic acid, or the copolymer of acrylic and methacrylic acid. The most preferred polyacrylic residue is the residue of the homopolymer of acrylic acid.

The polyacrylic residue may also be the residue of a polymer as defined above that has been partly esterified with an optionally substituted, aromatic, aliphatic or cycloaliphatic alcohol. Said polymer may be prepared by either copolymerizing an acrylic acid with an ester thereof, or by partly esterifying a polyacrylic acid. In the latter process, polyalcohols are less preferred due to the risk of undesired crosslinking of polymer chains.

Without any intention of being limited to one mechanism or theory of the operation of the invention, it can be said that the organic polyelectrolyte is believed to inhibit the formation of rigid polyurea domains, thereby producing softer foams and allowing a reduction in the levels of the use of halogenated hydrocarbon blowing agents of between 50 and 100% in preferred embodiments. These rigid domains are presumably formed (e.g., by crystallisation, hydrogen bonding or other mechanism) from urea units [—N(H)—C(0)—N(H)—] that are produced by employing water as a blowing agent. Then, one or more of the following reactions may take place:

1) $R-N=C=O + H_2O \longrightarrow R-N(H)-C(O)-OH$

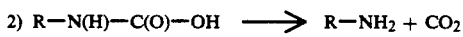

2) $R-N(H)-C(O)-OH \longrightarrow R-NH_2 + CO_2$

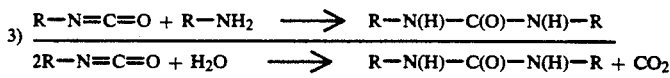

3) $$\frac{R-N=C=O + R-NH_2 \longrightarrow R-N(H)-C(O)-N(H)-R}{2R-N=C=O + H_2O \longrightarrow R-N(H)-C(O)-N(H)-R + CO_2}$$

The present invention suitably utilizes the polyisocyanates which have been used in conventional processes for the preparation of soft flexible polyurethane foams. Thus, examples of organic polyisocyanates which may be employed include aromatic, aliphatic and cycloaliphatic polyiosocyanates and combinations thereof. Representative of these types are the diisocyanates such as m-benzene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, 1,4-cyclohexane diisocyanate, hexahydrotoluene diisocyanate (and isomers), 1,5-naphthene diisocyanate, 2,4-methoxphenyl diisocyanate, 4,4'-diphenylmethan diisocyanate, 4,4'-biphenylene diisocyanate, 3,3'-dimethoxy-4,4'-biphenylene diisocyanate, and 3,3'-dimethyl-4,4'biphenylmethane diisocyanate; triisocyanates such as 4,4',4"-triphenylmethane triisocyanate, 1,6,11-undecane triisocyanate and 2,4,6-toluene triisocyanate; tetraisocyanates such as 4,4'-dimethyl-2,2',5,5'-diphenylmethane tetraiocyanate; and polymeric isocyanates such as polymethylene polyphenylene polyisocyanate.

Preferably, the polyisocyanate is one or a mixture of materials selected from the group consisting of the toluene diisocyanates, 4,4'-diphenylmethane diisocyanate and polymethylene polyphenylene polyisocyanate. More preferably a toluene diisocyanate is used, most preferably in a 2,4-/2,6- isomer ratio ranging from 65/35 to 80/20.

Crude polyisocyanates, i.e., technical unpurified mixtures of polyisocyanates, may also be used in the process of the present invention, such as crude toluene diisocyanate obtained by the phosgenation of a mixture of toluene diamines or crude diphenylmethane diisocyanate obtained by the phosgenation of crude diphenylmethane diisocyanate obtained by the phosgenation of crude diphenylmethane diamine. Also preferred are the crude isocyanates disclosed in U.S. Pat. No. 3,215,652, the relevant teachings of which are incorporated herein by this reference.

In addition, corresponding polyisothiocyanates, polyisoselenocyanates and mixtures thereof with other polyisocyanates may be employed.

Mixtures of polyisocyanates are generally suitable reactants for use in the invention.

Any one or more polyols having a molecular weight in the range from about 400 to about 12,000 may be used in the invention, such as the hydroxy-terminated polyester polyols and/or the hydroxy-terminated polyether polyols, both of which are well known in the art. Conventional polyols for preparation of flexible polyurethane foams are usually prepared by the reaction of a polyhydric alcohol with one or a mixture of alkylene oxides, usually ethylene oxide and/or propylene oxide. However, the effect of the present invention is also realized in modified polyols, e.g., polymer polyols, polymers containing alkanolamines and (pre)polymers thereof, as well as (other) polyols having a high solids content, for example, those referred to in European Patent Application 318,242.

In a preferred embodiment of the present invention, one or more polyols and one or more polyacrylate salts are premixed, and the polyisocyanate(s) and additives are metered into the resulting mixture during polymerization. For instance, a preferred premix composition comprises one or a blend of polyols having molecular weights in the range from about 400 to about 12,000, and one or a blend of non-crosslinked water-soluble polyacrylic acid salts having a molecular weight in the range from about 1,000 to about 20,000,000, and water. More preferred are premixes wherein the polyacrylic acid salts have molecular weights in the range from about 1,200 to about 5,000,000, particularly in compositions containing the polyacrylic acid salts in an amount in the range from about 0.001 to about 5 parts by weight per 100 parts by weight of the one or more polyols, and water in an amount in the range from about 0.5 to about 15 parts by weight per 100 parts by weight of the one or more polyols. Considered most preferred are premixes wherein the polyacrylic acid salts have molecular weights in the range from about 1500 to about 10,000 and are present in an amount in the range from about 0.01 to about 0.5 parts by weight per 100 parts by weight of the one or more polyols, and the water is present in an amount in the range from about 1.0 to about 10 parts by weight per 100 parts by weight of the one or more polyols.

In order to form the polyurethane foam smoothly, a catalyst useful in preparing foams is employed, for instance in a conventional manner. Suitable catalysts that may be used include: tertiary amines such as, for example triethylenediamine, N-methylmorpholine, N-ethylmorpholine, diethylethanolamine, N-cocomorpholine, 1-methyl-4-dimethylamino-ethylpiperzaine, 3-methoxpropyldimethylamine, N, N, N'-trimethylisopropyl propylenediamine, 3-diethylaminopropyldiethylamine, dimethylbenzylamine, and the like; tertiary phosphines such as trialkylphosphines, dialkylbenzylphosphines and the like; strong bases such as alkali and alkaline earth metal hydroxides, alkoxides and phenoxides; acidic metal salts of strong acids such as ferric chloride, stannic chloride, stannous chloride, antimony trichloride, bismuth nitrate and chloride, and the like; chelates of various metals such as those which can be obtained from acetyl-acetone, benzylacetone, trifluroacetylacetone, ethyl acetoacetate, salicyclaldehyde, cylcopentanone-1-carboxylate, acetylacetoneimine, bisacetylacetonealKylenediamine, salicyclaldehydeimine, and the like with various metals such as Be, Mg, Zn, Cd, Pd, Ti, Zr, Sn, As, Bi, Cr, Mo, Mn, Fe, Co, and Ni; alcoholates and phenolates of various metals such as $Ti(OR)_4$, $Sn(OR)_4$, $Al(OR)_3$, and the like wherein R is alkyl or aryl, and the reaction products of alcoholates with carboxylic acids, beta-diketones, and 2-(N,N-dialkyl-amino) alkanols; salts of organic acids with a variety of metals such as alkali metals, alkaline earth metals, Al, Sn, Pb, Mn, Co, Ni, and Cu, including, for example, sodium acetate, stannous octoate, stannous oleate, lead octoate, metallic driers such as manganese and cobalt naphthenate, and the like; and organometallic derivatives of tetravalent tin, trivalent and pentavalent As, Sb, and Bi and metal carbonyls of iron and cobalt, as well as other organometallic compounds such as those disclosed in U.S. Pat. No. 2,846,408.

It will be appreciated that combinations of any two or more polyurethane catalysts may be employed.

Usually, the total amount of catalyst is in the range from about 0.01 to about 5.0 pbw based on 100 pbw of the polyol. More often, the amount of catalyst used is between about 0.2 and about 2.0 pbw.

The foaming process is carried out in the presence of water and the polyacrylate salt and, optionally, additional organic blowing agents. Preferably, the blowing agent(s) are substantially free of halogenated hydrocarbons.

The water is normally used in amounts from about 0.5 to about 15 pbw, preferably from about 1.0 to about 10 pbw, and more preferably from about 2 to about 5 pbw, based on 100 pbw polyol.

Auxiliaries/additives which, for instance, regulate the cell size and the cell structure may also be suitably added to the foaming mixture. Examples of such auxiliaries/additives include silicone oils (such as dimethylpolysiloxanes) and flame retardants. Examples of suitable flame retardants include dicyanodiamide, cyanoamide, melamine, pentabromodiphenyl oxide, dibromopropanol, tris(beta-chloropropyl)phosphate, 2,2-bis-(bromoethyl)-1,3-propanediol, tetrakis(2-chloroethyl)ethylene diphosphate, ethylene diphosphate, tris(2,3-dibromopropyl)phosphate, tris(beta-chloroethyl)phosphate, tris(1,2-dichloropropyl)phosphate, bis(2-chloroethyl)-2-chloroethylphosphonate, molybdenum trioxide, ammonium molybdate, ammonium polyphosphate, pentabromodiphenyloxide, tricresyl phosphate, hexabromocyclododecane and dibromo ethyl-dibromocyclohexane. The concentration of flame retardant compounds typically ranges from about 1 to about 25 pbw per 100 pbw of polypol.

Fillers, dyes or plasticizers may also be used, as in conventional practice. These and other auxiliaries are well known to those skilled in the art.

The process of the invention is preferably practiced either continuously in an open environment employing a conveyer belt, or batch-wise in a closed mould by in-situ foaming, i.e., using a slabstock or moulding process.

The invention is further described with reference to the following examples, which illustrate certain preferred embodiments and are not intended to limit the invention's broader scope.

The examples particularly illustrate a slabstock production process. Amounts of materials utilized are in parts by weight, unless otherwise designated. The following abbreviations are used in the examples:

Caradol 48-2—a flexible polyol (sold by Shell) having an average molecular weight of about 3500 and prepared by addition of propylene oxide and ethylene oxide (weight ratio of about 6:1) to glycerol.
NaPa—sodium polyacrylate, $M_w=2000$
F11—trichlorofluoromethane
Sil (BF 2370)—a silicon oil (sold by Th. Goldschmidt A. G.)
dabco (33LV)—diazabicylooctane in solution
SnOct—stannous octoate
TDI—toluene diisocyanate All examples, unless indicated otherwise, were conducted under the following procedure. All components except for the isocynate compound were weighed and thoroughly mixed. An appropriate amount of isocyanate was then added within 3 seconds and mixed vigorously for 15 seconds. The mixture was poured in 2-3 seconds into a box ($30 \times 20 \times 15$ cm$^3$) and the foam was allowed to rise.

The physical properties of the resulting polyurethane foam formulations were determined after 48 hours by the following techniques:

| Density (kg/m$^3$) | ISO 845 |
|---|---|
| Compression hardness or CLD (kPa) | Din 53577 (i.e. ISO 3386-1) |
| Elongation (%) | ASTM D 3574 |

EXAMPLES 1 TO 6

Formulations A and D (examples 1 and 4) were prepared using a halogenated hydrocarbon as blowing agent, formulations B and E (examples 2 and 5) were prepared with only water as a blowing agent and formulations C and F (examples 3 and 6) were prepared with a water/sodium polyacrylate mixture as blowing agent. The products of examples 3 and 6 (according to the invention) were comparable to those of examples 1 and 4, and better than those of examples 2 and 5, as is evident from their compression hardness (CLD). Examples 1, 2, 4 and 5 were not in accordance with the invention and are provided for comparative purposes only.

| Formulations | A | B | C | D | E | F |
|---|---|---|---|---|---|---|
| Caradol | 100 | 100 | 100 | 100 | 100 | 100 |
| H$_2$O | 3.2 | 4.4 | 4.4 | 3.0 | 3.7 | 3.7 |
| NaPa | — | — | 0.15 | — | — | 0.10 |
| F11 | 11 | — | — | 6 | — | — |
| Sil | 1.2 | 1.2 | 1.2 | 0.9 | 1.0 | 1.0 |
| dabco | 0.09 | 0.05 | 0.05 | 0.12 | 0.06 | 0.06 |
| SnOct | 0.24 | 0.22 | 0.24 | 0.20 | 0.20 | 0.22 |
| Example | 1 | 2 | 3 | 4 | 5 | 6 |
| Formulation | A | B | C | D | E | F |
| TDI (index) | 108 | 105 | 105 | 104 | 104 | 104 |
| Density (kg/m$^3$) | 24.2 | 24.7 | 24.5 | 28.6 | 28.4 | 28.5 |
| CLD (kPa) | 2.1 | 3.4 | 2.1 | 2.3 | 3.5 | 2.3 |
| Elongation (%) | 190 | 250 | 160 | 180 | 270 | 180 |

EXAMPLES 7 TO 19

Three series of experiments were conducted. Within each series the foam density was held approximately constant. As shown by the results tabulated, within each series the hardness of the foam improved upon addition of sodium polyacrylate to a comparative formulation (not in accordance with the invention) in which only water was used as blowing agent (examples 7, 11, and 15).

| Formulations | G | H | I | J |
|---|---|---|---|---|
| Caradol | 100 | 100 | 100 | 100 |
| H$_2$O | 3.8 | 3.8 | 3.8 | 3.8 |
| NaPa | — | 0.05 | 0.10 | 0.15 |
| Sil | 1.2 | 1.2 | 1.2 | 1.2 |
| dabco | 0.08 | 0.08 | 0.08 | 0.08 |
| SnOct | 0.20 | 0.20 | 0.20 | 0.20 |
| Example | 7 | 8 | 9 | 10 |
| Formulation | G | H | I | J |
| TDI (index) | 105 | 105 | 105 | 105 |
| Density (kg/m$^3$) | 26.6 | 26.4 | 27.2 | 26.8 |
| CLD (kPa) | 3.0 | 2.6 | 2.4 | 1.9 |
| Elongation (%) | 270 | 175 | 160 | 180 |

| Formulations | K | L | M | N |
|---|---|---|---|---|
| Caradol | 100 | 100 | 100 | 100 |
| H$_2$O | 2.8 | 2.8 | 2.8 | 2.8 |
| NaPa | — | 0.05 | 0.10 | 0.15 |
| Sil | 0.9 | 0.9 | 0.9 | 0.9 |
| dabco | 0.12 | 0.12 | 0.12 | 0.12 |
| SnOct | 0.20 | 0.20 | 0.20 | 0.22 |
| Example | 11 | 12 | 13 | 14 |
| Formulation | K | L | M | N |
| TDI (index) | 105 | 105 | 105 | 105 |
| Density (kg/m$^3$) | 34.3 | 33.8 | 33.3 | 33.5 |
| CLD (kPa) | 3.1 | 2.7 | 2.3 | 2.3 |
| Elongation (%) | 270 | 180 | 170 | 170 |

| Formulations | O | P | Q | R | S |
|---|---|---|---|---|---|
| Caradol | 100 | 100 | 100 | 100 | 100 |
| H$_2$O | 4.8 | 4.8 | 4.8 | 4.8 | 4.8 |
| NaPa | — | 0.05 | 0.10 | 0.15 | 0.20 |
| Sil | 1.3 | 1.3 | 1.3 | 1.3 | 1.3 |
| dabco | 0.05 | 0.05 | 0.05 | 0.05 | 0.05 |
| SnOct | 0.20 | 0.20 | 0.20 | 0.26 | 0.32 |
| Example | 15 | 16 | 17 | 18 | 19 |
| Formulation | O | P | Q | R | S |
| TDI (index) | 105 | 105 | 105 | 105 | 105 |
| Density (kg/m$^3$) | 22.3 | 21.8 | 22.2 | 22.1 | 21.7 |
| CLD (kPa) | 2.9 | 2.65 | 2.3 | 2.2 | 2.0 |
| Elongation (%) | 230 | 170 | 160 | 180 | 200 |

EXAMPLES 20-26

Examples 20-26 were not carried out according to the invention. In Examples 20 the sodium polyacrylate having a molecular weight of 2000 was replaced by 0.15, 0.4 or 1.0 pbw of a sodium polyacrylate having a molecular weight of 1,250,000 (Carbopol 941, made by B.F. Goodrich Chemical Co.). The foam hardness of the formulations with high molecular weight sodium polyacrylate were identical or nearly identical to the hardness found for a formulation without softening agent (CLD>>3.0 kPa), indicating the inadequacy of the high molecular weight polyacrylate.

In example 21 the sodium polyacrylate was replaced by ammonium polyacrylate. No foam could be produced, due to lack of gelation, even after 45 minutes in an oven at 80° C.

Examples 23 to 26 employed magnesium polyacrylate (MgPa) instead of sodium polyacrylate. Again, the foam produced did not show an improved hardness. Example 22, without MgPa, is provided for comparison.

| Formulations | T | U | V | W | X |
|---|---|---|---|---|---|
| Caradol | 100 | 100 | 100 | 100 | 100 |
| H$_2$O | 3.8 | 3.2 | 3.2 | 2.2 | 2.2 |
| MgPa | — | 0.15 | 0.15 | 0.40 | 0.40 |
| Sil | 1.2 | 1.2 | 1.2 | 1.2 | 1.2 |
| dabco | 0.08 | 0.08 | 0.08 | 0.08 | 0.08 |
| SnOct | 0.20 | 0.22 | 0.22 | 0.22 | 0.22 |
| Example | 22 | 23 | 24 | 25 | 26 |
| Formulation | T | U | V | W | X |
| TDI (index) | 105 | 105 | 105 | 105 | 105 |
| Density (kg/m$^3$) | 26.7 | 26.9 | 27.2 | 27.1 | 26.8 |
| CLD (kPa) | 3.0 | 3.0 | 3.1 | 3.0 | 2.9 |

EXAMPLES 27 TO 40

Example 28 to 40 were conducted with sodium polyacrylates having molecular weight of 30,000 (examples 28 to 30); 75,000 (examples 31 to 33); 250,000 (examples 34 to 36); and 2,500,000 (examples 37 to 40), in formulations containing 0.05 pbw additive (examples 28, 31, 34, and 37); 0.10 pbw additive (examples 29, 32, 35, and 38); 0.15 pbw additive (examples 30, 33, 36, and 39); and 0.15 pbw additive (example 40). Example 27 was run for comparison. Although the high molecular weight sodium polyacrylate showed the desired hardness reducing effect, a greater amount of sodium polyacrylate was needed to obtain the same effect as achieved with the lower molecular weight sodium polyacrylate.

| Formulations | Y | Z | AA | BB |
|---|---|---|---|---|
| Caradol | 100 | 100 | 100 | 100 |
| H$_2$O | 4.4 | 4.4 | 4.4 | 4.4 |
| NaPa (30,000) | — | 0.05 | 0.10 | 0.15 |
| Sil | 1.1 | 1.1 | 1.1 | 1.1 |
| dabco | 0.05 | 0.085 | 0.085 | 0.05 |
| SnOct | 0.18 | 0.24 | 0.24 | 0.24 |
| Example | 27 | 28 | 29 | 30 |
| Formulation | Y | Z | AA | BB |
| TDI (index) | 105 | 105 | 105 | 105 |
| Density (kg/m$^3$) | 23.5 | 23.1 | 23.1 | 23.1 |
| CLD (kPa) | 3.0 | 2.5 | 2.2 | 2.0 |
| Formulations | Y | CC | DD | EE |
| Caradol | 100 | 100 | 100 | 100 |
| H$_2$O | 4.4 | 4.4 | 4.4 | 4.4 |
| NaPa (75,000) | — | 0.05 | 0.10 | 0.15 |
| Sil | 1.1 | 1.1 | 1.1 | 1.1 |
| dabco | 0.05 | 0.05 | 0.05 | 0.05 |
| SnOct | 0.18 | 0.24 | 0.24 | 0.24 |
| Example | 27 | 31 | 32 | 33 |
| Formulation | Y | CC | DD | EE |
| TDI (index) | 105 | 105 | 105 | 105 |
| Density (kg/m$^3$) | 23.5 | 23.3 | 23.3 | 23.3 |
| CLD (kPa) | 3.0 | 2.6 | 2.2 | 2.0 |
| Formulations | Y | FF | GG | HH |
| Caradol | 100 | 100 | 100 | 100 |
| H$_2$O | 4.4 | 4.4 | 4.4 | 4.4 |
| NaPa (250,000) | — | 0.05 | 0.10 | 0.15 |
| Sil | 1.1 | 1.1 | 1.1 | 1.1 |
| dabco | 0.05 | 0.05 | 0.05 | 0.05 |
| SnOct | 0.18 | 0.24 | 0.24 | 0.24 |
| Example | 27 | 34 | 35 | 36 |
| Formulation | Y | FF | GG | HH |
| TDI (index) | 105 | 105 | 105 | 105 |
| Density (kg/m$^3$) | 23.5 | 23.7 | 23.7 | 23.7 |
| CLD (kPa) | 3.0 | 2.6 | 2.3 | 2.2 |

| Formulations | Y | II | JJ | KK | LL |
|---|---|---|---|---|---|
| Caradol | 100 | 100 | 100 | 100 | 100 |
| H$_2$O | 4.4 | 4.4 | 4.4 | 4.4 | 4.4 |
| NaPa (2,500,000) | — | 0.05 | 0.10 | 0.15 | 0.20 |
| Sil | 1.1 | 1.1 | 1.1 | 1.1 | 1.1 |
| dabco | 0.05 | 0.05 | 0.05 | 0.05 | 0.05 |
| SnOct | 0.18 | 0.24 | 0.24 | 0.24 | 0.24 |
| Example | 27 | 37 | 38 | 39 | 40 |
| Formulation | Y | II | JJ | KK | LL |
| TDI (index) | 105 | 105 | 105 | 105 | 105 |
| Density (kg/m$^3$) | 23.5 | 24.0 | 24.0 | 24.0 | 24.0 |
| CLD (kPa) | 3.0 | 2.6 | 2.4 | 2.3 | 2.1 |

We claim as our invention:

1. A process for preparing a soft flexible polyurethane foam which comprises reacting (a) one or more organic polyisocyanates with (b) one or more polyols having molecular weights in the range from about 400 to about 12,000, in the presence of (c) a catalyst and (d) a blowing agent which comprises water in admixture with from about 0.001 to about 1 pbw, per 100 pbs polyol (b), of one or more non-crosslinked, water-soluble organic polyacrylate salts having a molecular weight in the range from about 1,500 to about 100,000.

2. The process of claim 1, wherein the amount of non-crosslinked water-soluble polyacrylate salts are in the range from about 0.01 to about 0.8 pbw, per 100 pbw of polyol (b).

3. The process of claim 2, wherein the non-crosslinked water-soluble polyacrylate salts have a molecular weight in the range from about 2000 to about 10,000, and wherein the amount of non-crosslinked polyacrylate is in the range from about 0.01 to about 0.5 pbw, per 100 pbw of polyol (b).

4. The process of claim 3, wherein the non-crosslinked water soluble polyacrylate salts are homopolymer salts of optionally substituted acrylic acids, or copolymer salts of optionally substituted acrylic acids, or copolymer salts of two or more optionally substituted acrylic acids.

5. The process of claim 4, wherein the non-crosslinked water-soluble polyacrylate salts are selected from the group consisting of homopolymer salts of acrylic acid, homopolymer salts of methacrylic acid, and copolymer salts of both acrylic acid and methacrylic acid.

6. The process of claim 1, wherein the polyisocynates are selected from the group consisting of 4,4'-diphenylmethane diisocynate and toluene diisocynate, and the polyol is a polyether polyol.

7. The process of claim 3, wherein the polyisocyanates are selected from the group consisting of 4,4'-diphenyl-methane diisocyanate and toluene diisocyanate, and the polyol is a polyether polyol.

8. A premix composition useful in the preparation of polyurethane foams, comprising one or a blend of polyols having molecular weights in the range from about 400 to about 12,000, one or a blend of non-crosslinked water-soluble polyacrylic acid salts having molecular weights in the range from about 1,000 to about 20,000,000, and water.

9. The premix composition of claim 8, wherein the polyacrylic acid salts have molecular weights in the range from about 1,200 to about 5,000,000.

10. The premix composition of claim 8, wherein the polyacrylic acid salts are present in an amount in the range from about 0.001 to about 5 parts by weight per 100 parts by weight of the one or more polyols, and the water is present in an amount in the range from about 0.5 to about 15 parts by weight per 100 parts by weight of the one or more polyols.

11. The premix composition of claim 10, wherein the polyacrylic acid salts have molecular weights in the range from about 1500 to about 10,000 and are present in an amount in the range from about 0.01 to about 0.5 parts by weight per 100 parts by weight of the one or more polyols, and the water is present in an amount in the range from about 1.0 to about 10 parts by weight per 100 parts by weight of the one or more polyols.

* * * * *